United States Patent [19]
Nishida

[11] Patent Number: 5,805,254
[45] Date of Patent: Sep. 8, 1998

[54] LIQUID CRYSTAL DEVICE AND PROCESS FOR PRODUCTION THEREOF HAVING PLURAL INSULATING LAYERS

[75] Inventor: Naoya Nishida, Hadano, Japan

[73] Assignee: Canon Kabushiki Kaisha, Tokyo, Japan

[21] Appl. No.: 728,916

[22] Filed: Oct. 11, 1996

[30] Foreign Application Priority Data

Oct. 12, 1995 [JP] Japan ..................................... 7-264334

[51] Int. Cl.$^6$ ...................... G02F 1/1337; G02F 1/1333; G02F 1/13
[52] U.S. Cl. ........................... 349/138; 349/123; 349/172
[58] Field of Search .................... 349/138, 123, 349/172

[56] References Cited

U.S. PATENT DOCUMENTS

| | | | |
|---|---|---|---|
| 5,000,545 | 3/1991 | Yoshioka et al. | 349/148 |
| 5,124,826 | 6/1992 | Yoshioka et al. | 347/148 |
| 5,150,233 | 9/1992 | Enomoto et al. | 349/147 |
| 5,185,059 | 2/1993 | Nishida et al. | 349/106 |
| 5,227,899 | 7/1993 | Nobuyuki | 349/138 |
| 5,231,526 | 7/1993 | Itoh | 349/138 |
| 5,270,846 | 12/1993 | Watanabe et al. | 349/138 |
| 5,278,683 | 1/1994 | Nishida et al. | 349/106 |
| 5,282,070 | 1/1994 | Nishida et al. | 349/111 |
| 5,396,354 | 3/1995 | Shimada et al. | 349/138 |

FOREIGN PATENT DOCUMENTS

| | | | |
|---|---|---|---|
| 3904-029 | 8/1989 | Germany | 349/138 |
| 62-47027 | 2/1987 | Japan | 349/138 |
| 5-142527 | 6/1993 | Japan | 349/138 |
| 5-31313 | 11/1993 | Japan | 349/138 |
| 6-230417 | 8/1994 | Japan | 349/138 |

*Primary Examiner*—William L. Sikes
*Assistant Examiner*—Toan Ton
*Attorney, Agent, or Firm*—Fitzpatrick, Cella, Harper & Scinto

[57] ABSTRACT

A liquid crystal device is formed by disposing a liquid crystal between a pair of substrates each having thereon an electrode pattern. At least one of the substrates is provided with an insulating film comprising a first insulating layer formed by wet-coating and baking, and a second insulating layer formed by vacuum deposition closer to the liquid crystal than the first insulating layer. The insulating film stably has an excellent dielectric strength, so that the productivity and production yield of the liquid crystal device can be improved. Further, the insulating film allows less strict control of production environment and time after the formation, so that the production cost can be reduced.

14 Claims, 1 Drawing Sheet

LIQUID CRYSTAL DEVICE AND PROCESS FOR PRODUCTION THEREOF HAVING PLURAL INSULATING LAYERS

FIELD OF THE INVENTION AND RELATED ART

The present invention relates to a liquid crystal device and a process for production thereof, more particularly a liquid crystal device capable of preventing insulating failure between the substrates and also a process for producing such a liquid crystal device.

An ordinary liquid crystal device may comprise a pair of oppositely disposed substrates each having an electrode thereon, and a liquid crystal disposed between the substrates. The surface of each substrate contacting the liquid crystal is generally provided with an alignment film. In such a liquid crystal device, at least one substrate is generally provided with an insulating film on the electrode thereon (i.e., between the electrode and the alignment film thereon) so as to electrically insulate the opposing electrodes from each other.

Conventionally, the above-mentioned insulating film has been generally provided as an $SiO_2$ film formed by sputtering. Further, in a liquid crystal device using a chiral smectic liquid crystal, such as a ferroelectric liquid crystal, an insulating film of $Ta_2O_5$ having a large dielectric constant has been generally formed by sputtering.

A $Ta_2O_5$ film has a dielectric constant which is ca. 5 times as large as that of an $SiO_2$ film. However, as the alignment film formed on the insulating film is made thinner, there has been observed a tendency that the alignment characteristic of the ferroelectric liquid crystal becomes inferior due to the influence of the $Ta_2O_5$ insulating film formed by sputtering.

On the other hand, it has been reported that the use of an insulating film formed by wet-coating of a mixture liquid comprising hydroxides and/or organooxides of silicon, titanium, tantalum, zirconium, etc., e.g., by flexography, followed by baking, as an insulating film instead of an inorganic oxide film formed by sputtering, can provide a good alignment characteristic for a ferroelectric liquid crystal even if the organic alignment film is made thinner.

Incidentally, in the above-mentioned case of forming an inorganic oxide film by wet-coating and then baking, it is necessary to effect the baking at a temperature of at most 270° C., preferably at most 250° C., in view of the heat resistance of other component materials (such as a color filter, a flattenering film, etc.) of a (ferroelectric) liquid crystal device. An inorganic oxide film formed through baking under such a temperature condition is liable to have a lower hardness than a film formed by sputtering. A film of a lower hardness is liable to cause sinking or breakage due to commingling foreign matter, etc., thus being liable to result in short circuit.

Further, in case where a projecting foreign matter is present on a surface to be wet-coated, a wet-coating liquid such as a printing liquid is liable to be repelled, thus failing to cover the foreign matter and causing a pinhole. For example, in case where an electroconductive foreign matter is present on an electrode pattern, the failure in coating the foreign matter with an insulating film, results in a short circuit between opposite electrodes.

Therefore, in order to obviate the above-mentioned difficulties of the sputtering method and the wet-coating method, there has been proposed a liquid crystal device having a double-layered insulating film on the electrode pattern including a first insulating layer formed by sputtering and a second insulating layer formed by wet-coating so as to prevent short circuit between the electrodes and ensure good alignment of liquid crystal molecules (U.S. Pat. No. 5,270, 846). In the liquid crystal device, the first insulating layer (first inorganic oxide layer) formed by sputtering on the electrode pattern ensures an enhanced film hardness and coverage of an electroconductive foreign matter, and the second insulating layer (second inorganic oxide layer) formed by wet-coating ensures a good liquid crystal molecular alignment characteristic.

Incidentally, the above-mentioned second insulating layer formed by conventional wet-coating and baking is liable to absorb a large amount of moisture in air, e.g., when left-standing in a room after the film formation. This property may presumably be attributable to a higher polarity of the film formed by wet-coating and baking than a film formed by vacuum deposition, such as sputtering. Such moisture absorbed within the film can remarkably lower the dielectric strength of the insulating layer, thus causing a short circuit between the electrodes.

Accordingly, in the case of using a doublelayered insulating film, it has been necessary to effect strict control of environment and time within steps from the formation of the second insulating layer until the formation of an alignment film, thus providing factors causing an increase in apparatus cost for and a lowering in yield of liquid crystal device production.

SUMMARY OF THE INVENTION

In view of the above-mentioned circumstances, an object of the present invention is to reliably prevent an insulation failure between opposite electrodes in a liquid crystal device without causing an increase in production apparatus cost or a lowering in production yield.

According to the present invention, there is provided a liquid crystal device, comprising: a pair of substrates each having thereon an electrode pattern, and a liquid crystal disposed between the substrates; wherein at least one of the substrates is provided with an insulating film comprising a first insulating layer formed by wet-coating and baking, and a second insulating layer formed by vacuum deposition closer to the liquid crystal than the first insulating layer.

According to another aspect of the present invention, there is provided a liquid crystal device, comprising: a pair of substrates each having thereon an electrode pattern, and a liquid crystal disposed between the substrates; wherein at least one of the substrates is provided with an insulating film comprising a first insulating layer comprising $SiO_2$ and $TiO_2$, and a second insulating layer comprising $Ta_2O_5$ disposed closer to the liquid crystal than the first insulating layer.

According to the present invention, there is further provided a process for producing a liquid crystal device of the type comprising a pair of substrates each having an electrode pattern thereon and a liquid crystal disposed between the substrates, said process comprising the steps of:

forming a first insulating layer by wet-coating and baking on at least one of the substrates, and forming a second insulating layer by vacuum deposition on the first insulating layer.

These and other objects, features and advantages of the present invention will become more apparent upon a consideration of the following description of the preferred embodiments of the present invention taken in conjunction with the accompanying drawing.

DESCRIPTION OF THE PREFERRED EMBODIMENTS

Figure 1:
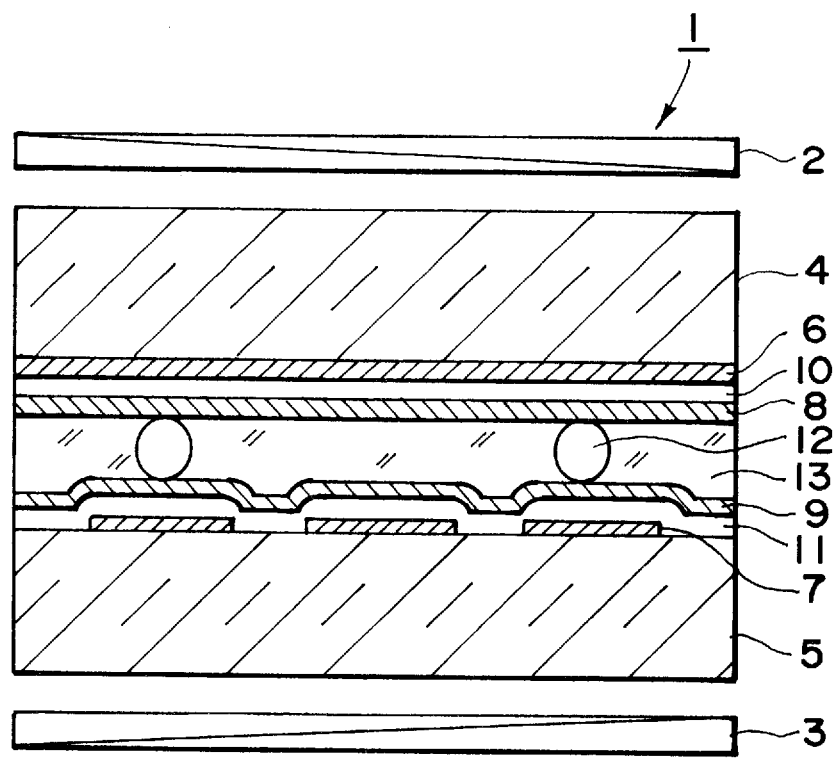
FIG. 1 is a schematic sectional view of an embodiment of the liquid crystal device according to the present invention.

FIG. 1 is a schematic sectional view of an embodiment of the liquid crystal device according to the present invention. Referring to FIG. 1, a liquid crystal device 1 has a cell or panel structure generally defined by a pair of oppositely disposed glass substrates 4 and 5, which are disposed between a pair of polarizers 2 and 3. The glass substrates 4 and 5 are successively provided, on their opposing surfaces, with patterned transparent electrodes 6 and 7, insulating films 11 and 12, and alignment films 8 and 9, respectively.

Between the alignment films 8 and 9, a plurality of spherical spacer beads 12 having a uniform particle size are disposed so as to keep constant a gap between the substrates, more specifically a gap between the alignment films 8 and 9. The glass substrates 4 and 5 are applied to each other with a sealing adhesive (not shown) of, e.g., epoxy resin, at a periphery or in the neighborhood of the periphery of the liquid crystal device 1 so as to define a region into which a liquid crystal is injected. Thus, in this embodiment, a chiral smectic liquid crystal 13 is disposed. The gap between the substrates is kept constant so as not be enlarged in excess of the diameter of the spacers, preferably by disposing a plurality of adhesive beads (not shown) of, e.g., epoxy resin.

The glass substrates 4 and 5 can be replaced by other transparent substrates of, e.g., plastic. The transparent electrodes may preferably comprise a material having a high optical transmittance and also a high electroconductivity, most suitably indium tin oxide (ITO). The alignment films 8 and 9 may for example comprise a film of an organic polymer, such as polyimide, or polyamide or polysilocane, or a film of an inorganic compound, such as SiO. At least one of the alignment films 8 and 9 may preferably be subjected to a uniaxial aligning treatment, such as rubbing. In view of the performance of aligning liquid crystal molecules, at least one of the alignment films 8 and 9 may preferably comprise a rubbed film of polyimide.

Figure 2:
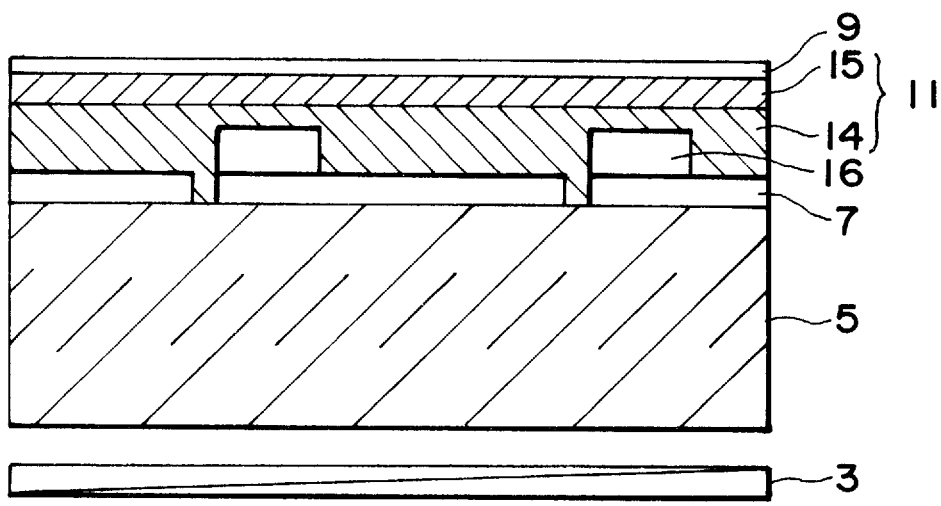
FIG. 2 is a schematic detailed partial view of one substrate in the liquid crystal device shown in FIG. 1.

FIG. 2 is a schematic sectional view showing a further detailed sectional structure of one of the pair of substrates. FIG. 2 shows a lower glass substrate 5 but the other substrate 4 is composed similarly in this embodiment.

Referring to FIG. 2, each transparent electrode 7 on the substrate 5 is provided with an auxiliary electrode 16 for providing a lower resistance. The auxiliary electrode 17 need not be light-transmissive but may preferably comprise a metal material having a high electroconductivity, such as aluminum or copper. The auxiliary electrode 16 may comprise either a single metal or an alloy, or may have a laminate film structure.

As shown in FIG. 2, the insulating layer 11 has a double layer structure including a first insulating layer 14 and a second insulating layer 15. The first insulating layer 14 is formed over the transparent electrode pattern 7 by wet-coating (printing) and baking so as to provide a layer thickness of preferably 25–500 nm, further preferably 50–300 nm. The baking may preferably be effected in a temperature range of 150°–270° C., further preferably 200°–250° C.

The first insulating layer 14 may comprise an inorganic material. More specifically, the first insulating layer 14 may preferably comprise at least one material selected from silicon monoxide, silicon dioxide, aluminum oxide, zirconia, cerium oxide, ditantalum pentoxide and titanium dioxide.

The first insulating layer 14 can also contain an inorganic oxide filler dispersed in an inorganic oxide binder. The filler may be in the form of spherical or non-spherical particles or fiber.

The first insulating layer 14 may be formed by wet-coating of an ink containing an organometallic compound as a precursor to the inorganic oxide. Examples of the organometallic compound may include: organoalkylsilanes, such as organomethoxysilane and organoethoxysilane; titanium orthoesters, such as tetraisopropyl titanate and butyl titanate dimmer; and titanium chelates, such as titanium acethylacetonate. These organometal compounds can be blended so as to provide a desired composition of the first insulating layer 14, if desired.

The first insulating layer 14 may be coated with a second insulating layer 15 by vacuum deposition, preferably by sputtering. Before sputtering, it is preferred to effect degassing of the first insulating layer 14 on the substrate 7 under heating to establish a high vacuum state on the order of $10^{-4}$ Pa. Then, sputtering may be performed in a gaseous environment of 0.2–1 Pa given, e.g., by a mixture of $O_2$ and an inert gas, preferably Ar. In the high vacuum state, substantially all the moisture in the first insulating layer 14 may be removed. Accordingly, as the second insulating layer 15 is formed on the dried first insulating layer 14, the first insulating layer 14 may be substantially moisture-free to provide an extremely reliable insulating layer.

The second insulating layer 15 may preferably be formed in a thickness of 25–500 nm, more preferably 50–300 nm. The second insulating layer 15 may comprise an inorganic material. More specifically, the second insulating layer 15 may preferably comprise at least one material selected from silicon monoxide, silicon dioxide, aluminum oxide, zirconia, cerium oxide, ditantalum pentoxide and titanium dioxide.

After the formation of the second insulating layer 15, the first insulating layer 14 is not directly exposed to the atmosphere even if the liquid crystal device 1 or the substrate 5 is exposed to the atmosphere, so that the first insulating layer 14 is free from absorption of atmospheric moisture.

The second insulating layer 15 can be further coated with a third insulating layer (not shown). The third insulating layer may be formed of any desired material according to any desired method. When the alignment film 9 is desired to provide an uneven boundary with the liquid crystal 13, the third insulating layer may preferably be formed as a film comprising an inorganic oxide binder and a particulate filler dispersed therein through wet-coating and baking in a similar manner as in formation of the first insulating layer 14. The filler may be in the form of spherical or non-spherical particles or fiber.

Hereinbelow, the present invention will be described more specifically based on Examples.

Example 1

A 1.1 mm-thick blue sheet glass substrate was coated with an ITO film by sputtering, followed by patterning by photolithography, to form a 70 nm-thick transparent electrode pattern, which was further coated with an Mo film by sputtering, followed by etching to form a 150 nm-thick Mo auxiliary electrode pattern, to form an electrode plate.

Then, the electrode plate was further coated by flexographic printing with an insulating film precursor ink ("MOF", available from Tokyo Ohka Kogyo K. K.; a mixture liquid having a viscosity of 30 mPa.s and containing 8 wt. % of solid matter comprising an organotitanium compound and an organosilicon compound), followed by drying and baking to form a 60 nm-thick first insulating layer of SiO/TiO (=1/1) mixture.

Incidentally, the printing was performed by applying and extending the above precursor ink on a glass sheet different from the substrate by using a spinner, and the applied ink was transferred onto a printing plate of of cured photosensitive resin ("CYREL", available from E. I. Du Pont) and then printed on the electrode plate. The electrode plate coated with the ink was dried for ca. 1 min. on a hot plate at 80° C., irradiated with 3.6 J of ultraviolet rays from a low-pressure mercury lamp to promote the removal of the organic matter, and then finally subjected to ca. 1 hour of baking in an oven at 270° C.

Then, the first insulating layer formed on the electrode plate was coated with a 90 nm-thick second insulating layer of $Ta_2O_5$ by sputtering. More specifically, before the sputtering, the electrode plate was subjected to pre-heating at 150° C. for removing the moisture in the first insulating layer, and then the sputtering was performed by using a target of $Ta_2O_5$, an input power of 2 kW, a gas flow ratio of $Ar/O_2=1190/10$ and a total pressure of 0.4 Pa.

Then, the electrode plate provided with an insulating film comprising the first and second insulating layers was further coated with a 4 nm-thick polyimide alignment film, followed by rubbing to provide a liquid crystal device substrates.

Two device substrates were provided in the above-described manner. Onto one of the device substrates, silica beads of 2.0 μm in average diameter were dispersed and, after application of a seeling adhesive, the other device substrate was applied to form a blank device having a gap of 2 μm between the substrates. Into the blank device, a ferroelectric liquid crystal was injected at an elevated temperature and then gradually cooled into chiral smectic C phase, whereby a liquid crystal device was prepared to have a diagonal size of ca. 15 inches and 1024×1280 pixels.

The thus-prepared liquid crystal device of this Example was completely free from insulation failure (short circuit) between the opposite electrodes as represented by an inferior product occurring rate of at most 1% and was found to show a good alignment state of liquid crystal molecules.

Comparative Example 1

A comparative liquid crystal device was prepared in the same manner as in Example 1 except that the first and second insulating layers were formed in a reverse order. More specifically, the electrode plate was first coated with a 90 nm-thick $Ta_2O_5$ layer by sputtering and then with a 60 nm-thick mixture layer of $SiO/TiO_2=1/1$ by wet-coating and baking of the precursor ink ("MOF" as in Example 1). The other steps were identically performed.

The thus-prepared comparative liquid crystal device was found to have partially caused an insulation failure (short circuit) between the transparent electrodes as represented by an inferior product occurring rate of 20% or higher.

As a result of analysis, it was found that the insulation failure was caused by different orders of insulating layers in the laminate insulating film and was attributable to the fact that the inorganic oxide insulating layer formed from "MOF" was liable to result in a lowering in dielectric strength of the entire insulating film if no moisture absorption-preventing treatment was applied thereto after the formation thereof.

Example 2

A liquid crystal device was prepared in the same manner as in Example 1 except that the first insulating layer was formed as a mixture layer comprising a binder mixture of 9 wt. parts of $SiO_2:TiO_2:ZrO_2=3:5:1$ and 1 wt. part of a filler of $SiO_2$ particles of ca. 40 nm in average diameter dispersed in the binder.

More specifically, the first insulating layer was formed by flexographic printing of an insulating film precursor ink ("Celamate PAM-606J13", available from Shokubai Kasei Kogyo K. K.; a mixture liquid having a viscosity of 25 mPa.S, containing 8 wt. % of solid matter comprising an organotitanium compound and an organosilicon compound and containing the silica particles dispersed therein). Thereafter, the drying and UV-irradiation were performed in the same manner as in Example 1, followed by baking at 270° C. for ca. 15 min.

The thus-prepared liquid crystal device of this Example was completely free from insulation failure (short circuit) between the opposite electrodes and was found to show a good alignment state of liquid crystal molecules similarly as the liquid crystal device of Example 1.

Example 3

A liquid crystal device was prepared in the same manner as in Example 1 except that the second insulating layer was further coated with a third insulating layer which was a mixture layer comprising a binder mixture of $SiO_2:TiO_2:ZrO_2=3:5:1$ and a filler of $SiO_2$ particles of ca. 40 nm in average diameter dispersed in the binder. The third insulating layer was formed in a similar manner as the first insulating layer in Example 2.

The thus-prepared liquid crystal device of this Example was completely free from insulation failure (short circuit) between the opposite electrodes and was found to show a good alignment state of liquid crystal molecules similarly as the liquid crystal device of Example 1.

As described above, according to the present invention, a stable insulating film having excellent dielectric strength can be formed as a laminate including a first insulating layer formed by wet-coating and baking on an electrode on a substrate, and a second insulating layer formed by vacuum deposition on the first insulating layer. As a result, it becomes possible to accomplish increased liquid crystal device productivity and production yield. Further, as the requirement for strict control of the production environment and production time for the insulating film production can be alleviated, it becomes possible to lower the production cost.

What is claimed is:

1. A liquid crystal device, comprising: a pair of substrates each having thereon an electrode pattern, and a liquid crystal disposed between the substrates; wherein at least one of the substrates is provided with an insulating film comprising a first insulating layer formed by wet-coating and baking, and a second insulating layer formed by vacuum deposition closer to the liquid crystal than the first insulating layer, said first insulating layer being moisture-absorptive but being in a substantially moisture-free state by covering with the second insulating layer which is less moisture-absorptive than the first insulating layer.

2. A device according to claim 1, wherein said vacuum deposition comprises sputtering.

3. A device according to claim 2, wherein said sputtering is performed in a gaseous environment of 0.2–1 Pa.

4. A device according to claim 1, wherein said first and second insulating layers independently comprise at least one material selected from the group consisting of silicon monoxide, silicon dioxide, aluminum oxide, zirconia, cerium oxide, ditantalum pentoxide and titanium dioxide.

5. A device according to claim 1, wherein said insulating film further includes a third insulating layer formed by wet-coating and baking closer to the liquid crystal than the second insulating layer.

6. A device according to claim 1, wherein at least one of the substrates is further provided with an alignment film contacting the liquid crystal.

7. A device according to claim 1, wherein said liquid crystal is a chiral smectic liquid crystal.

8. A liquid crystal device, comprising: a pair of substrates each having thereon an electrode pattern, and a liquid crystal disposed between the substrates; wherein at least one of the substrates is provided with an insulating film comprising a non-patterned first insulating layer comprising $SiO_2$ and $TiO_2$, and a non-patterned second insulating layer comprising $Ta_2O_5$ disposed closer to the liquid crystal than the first insulating layer.

9. A device according to claim 8, wherein said first insulating layer contains $ZrO_2$.

10. A device according to claim 8, wherein said first insulating layer contains a filler comprising $SiO_2$.

11. A device according to claim 10, wherein said filler is in the form of particles.

12. A device according to claim 8, wherein said insulating film further comprises a third insulating layer comprising $SiO_2$, $TiO_2$ and $ZrO_2$ disposed closer to the liquid crystal than the second insulating layer.

13. A device according to claim 8, wherein at least one of the substrates is further provided with an alignment film contacting the liquid crystal.

14. A device according to claim 8, wherein said liquid crystal is a chiral smectic liquid crystal.

* * * * *